United States Patent [19]

Minamitani et al.

[11] Patent Number: 4,987,876
[45] Date of Patent: Jan. 29, 1991

[54] FUEL INJECTION SYSTEM FOR AN INTERNAL COMBUSTION ENGINE

[75] Inventors: Kunitomo Minamitani; Tetsuro Takaba, both of Kure; Terufumi Yamashita, Aki; Toshihide Nishikawa, Higashihiroshima, all of Japan

[73] Assignee: Mazda Motor Corporation, Hiroshima, Japan

[21] Appl. No.: 377,411

[22] Filed: Jul. 10, 1989

[30] Foreign Application Priority Data

Jul. 11, 1988 [JP] Japan .................. 63-172961

[51] Int. Cl.$^5$ ............. F02D 41/34; F02D 41/18
[52] U.S. Cl. .................... 123/492; 123/478
[58] Field of Search ........... 123/478, 480, 490, 492, 123/494

[56] References Cited

U.S. PATENT DOCUMENTS

| | | | |
|---|---|---|---|
| 4,620,519 | 11/1986 | Nagao et al. | 123/492 |
| 4,630,206 | 12/1986 | Amamo et al. | 123/492 |
| 4,690,117 | 9/1987 | Isobe et al. | 123/494 |
| 4,697,568 | 10/1987 | Yasuoka | 123/478 |
| 4,718,387 | 1/1988 | Shinchi et al. | 123/490 |
| 4,753,210 | 6/1988 | Fujimoto et al. | 123/490 |
| 4,782,810 | 11/1988 | Shimoda et al. | 123/494 |
| 4,785,786 | 11/1988 | Nagao et al. | 123/488 |
| 4,811,231 | 3/1989 | Hataoka et al. | 123/431.05 |

FOREIGN PATENT DOCUMENTS

| | | | |
|---|---|---|---|
| 57-136863 | 2/1956 | Japan . | |
| 0005525 | 1/1982 | Japan | 123/478 |
| 60-116840 | 6/1985 | Japan . | |

Primary Examiner—Tony M. Argenbright
Assistant Examiner—Robert E. Mates
Attorney, Agent, or Firm—Wenderoth, Lind & Ponack

[57] ABSTRACT

A multi-cylinder internal combustion engine is provided with a fuel injection system, which includes a plurality of fuel injection nozzles securely mounted in independent intake passages communicating with combustion chambers of respective cylinders, an air-flow sensor for detecting the amount of intake air to be led into each combustion chamber, a crank angle sensor and a cylinder discrimination sensor for detecting the present stroke timing of each cylinder, a speed sensor for detecting the engine speed and a control unit for outputting a signal to the fuel injection nozzles so that a predetermined amount of fuel may be injected to each cylinder at a predetermined timing on the basis of values detected by the respective sensors. The control unit calculates the injection timing of fuel to be injected into each cylinder so that the injection start timing may be altered in compliance with driving conditions of the engine. The control unit also calculates the amount of fuel to be injected into each cylinder on the basis of at least the amount of intake air and the engine speed. The amount of intake air is detected at a timing which is altered in compliance with the injection start timing and close to this timing.

2 Claims, 7 Drawing Sheets

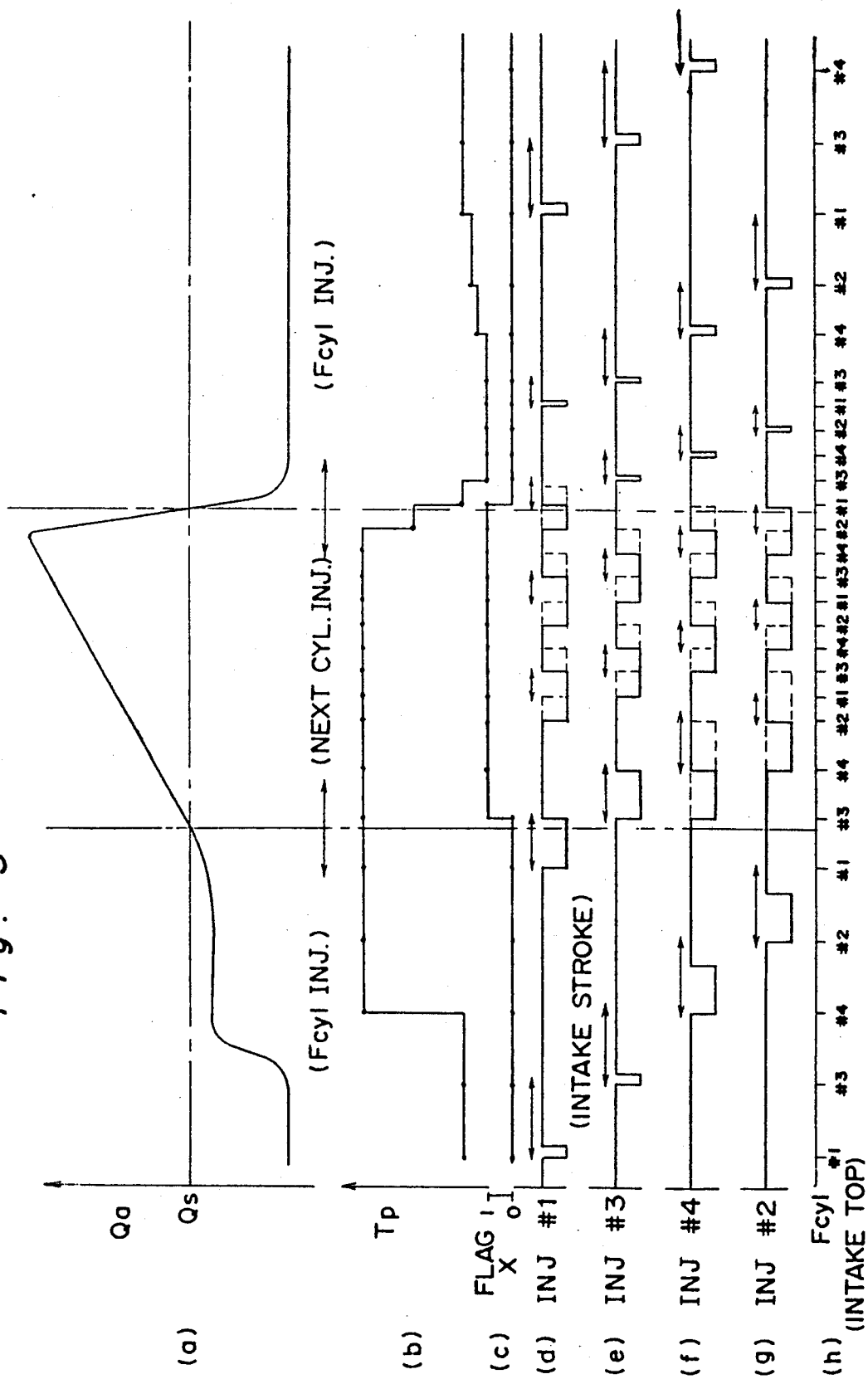

FUEL INJECTION SYSTEM FOR AN INTERNAL COMBUSTION ENGINE

BACKGROUND OF THE INVENTION

1. Field of the Invention

The present invention relates to an electronically controlled fuel injection system for an internal combustion engine.

2. Description of the Prior Art

In an electronically controlled fuel injection system for an internal combustion engine, the amount of intake air is generally detected at a predetermined timing for each predetermined cylinder or for each predetermined cylinder group so that the amount of fuel to be injected may be calculated on the basis of the detected value.

To supply fuel by an amount corresponding to the amount of air actually led into a combustion chamber of each cylinder, it is necessary to detect the amount of intake air at a timing close to the timing at which fuel is actually injected. If the timing for detecting the amount of intake air deviates too much from that of the actual fuel injection, the change of the amount of intake air between these timings is not properly reflected on the amount of fuel to be injected. Accordingly, it becomes impossible to properly control the air-fuel ratio in a transition stage. Because of this, it is considered that the fuel injection had better be performed during the intake stroke of each cylinder and it is preferable to perform, immediately before the fuel injection, the detection of the amount of intake air and the calculation of the amount of fuel to be injected on the basis of such detection.

The fuel injection during the intake stroke hardly causes any problem when the engine load is low. However, when the engine load becomes high and requires an increased amount of fuel and the period required for the fuel injection is prolonged, there arises a phenomenon that the injected fuel can not completely enter the combustion chamber during the intake stroke. Accordingly, the detection of the amount of intake air and the calculation of the amount of fuel to be injected are usually performed prior to the intake stroke, thus making it possible to set the fuel injection timing in compliance with the period of time required for the fuel injection at a high load. In this case, the injection timing is occasionally rendered to be variable according to the engine load. However, uniformly advancing the timing for detecting the amount of intake air in such a manner cannot achieve fuel injection corresponding to the actual amount of intake air at the time of transition as described above and is followed by a problem in that the air-fuel ratio momentarily becomes lean, resulting in lowered drivability.

The Japanese Patent Laid-open Application No. 60-116840 discloses a fuel injection system in which the amount of air to be actually led into the combustion chamber of each cylinder is accurately detected. In this system, the fuel injection is performed in compliance with the amount of intake air which changes with time, even in the intake stroke, particularly at the time of transition. To this end, the calculation of the amount of fuel to be injected is performed a plurality of times in the intake stroke of each cylinder so that fuel may be injected on the basis of each calculation. However, this system also involves a problem in that the injected fuel cannot completely enter the combustion chamber during the intake stroke when the engine load is high and the injection pulse width becomes long.

SUMMARY OF THE INVENTION

Accordingly, the present invention has been developed with a view to substantially eliminating the above described disadvantage inherent in the prior art fuel injection system for an internal combustion engine, and has for its essential object to provide an improved fuel injection system which can obtain, in a wide driving range, injection of an appropriate amount of fuel corresponding to the amount of intake air actually led into a combustion chamber of each cylinder during its intake stroke.

Another important object of the present invention is to provide a fuel injection system of the above described type which makes it possible to supply the entire injected fuel into the combustion chamber within the intake stroke, regardless of the driving conditions.

In accomplishing these and other objects, the fuel injection system according to the present invention is generally employed in a multi-cylinder internal combustion engine and comprises fuel injection means securely mounted in independent intake passages communicating with the corresponding combustion chambers of the cylinders, means for detecting the amount of intake air to be led into each combustion chamber, means for detecting the present stroke timing of each cylinder, means for detecting the engine speed, and control means for outputting a signal to the fuel injection means so that a predetermined amount of fuel may be injected to each cylinder at a predetermined timing on the basis of values detected by the respective detecting means.

The control means comprises means for setting the injection timing of fuel to be injected into each cylinder so that the injection start timing may be altered in compliance with driving conditions of the engine and means for setting the amount of fuel to be injected into each cylinder on the basis of at least the amount of intake air and the engine speed. The amount of intake air is detected at a timing which is altered in compliance with the injection start timing to be set by the fuel injection timing setting means. The timing for detecting the amount of intake air is close to the injection start timing.

By the above described constitution, the amount of intake air is detected at a predetermined timing prior to the intake stroke with respect to each cylinder. On the basis of the detected value, an appropriate amount of fuel is calculated and injected to the corresponding cylinder a a predetermined timing by the fuel injection means.

When the calculated value of the amount of fuel to be injected is relatively large, the fuel injection timing is altered so that the entire injected fuel may be completely led into the combustion chamber of a target cylinder during its intake stroke.

Furthermore, the timing for detecting the amount of intake air is altered in compliance with the altered fuel injection timing, and the detection of the amount of intake air and the calculation of the amount of fuel to be injected on the basis thereof are performed at an appropriate timing immediately before the fuel injection.

BRIEF DESCRIPTION OF THE DRAWINGS

These and other objects and features of the present invention will become more apparent from the following description taken in conjunction with preferred embodiments thereof with reference to the accompanying drawings, throughout which like parts are designated by like reference numerals, and wherein;

FIG. 3 (a–h) is a time-chart indicative of the control characteristic of the fuel injection system according to a first embodiment of the present invention;

DETAILED DESCRIPTION OF THE PREFERRED EMBODIMENTS

Figure 1:
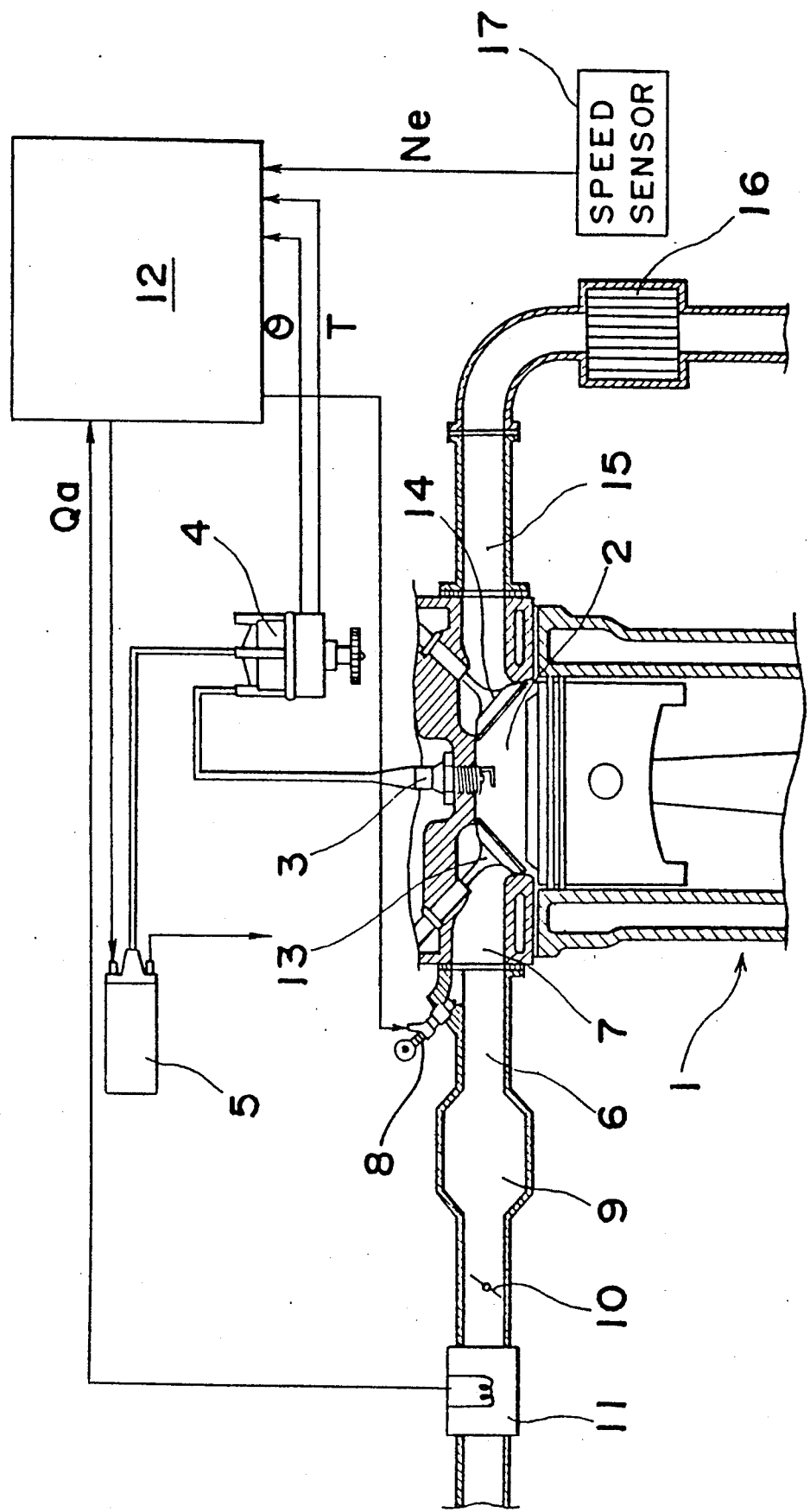
FIG. 1 is a schematic view, partly in section, of an entire fuel injection system according to the present invention.

Referring now to the drawings, there is shown in FIG. 1 an entire fuel injection system for a four-cylinder internal combustion engine according to the present invention.

Figure 2:
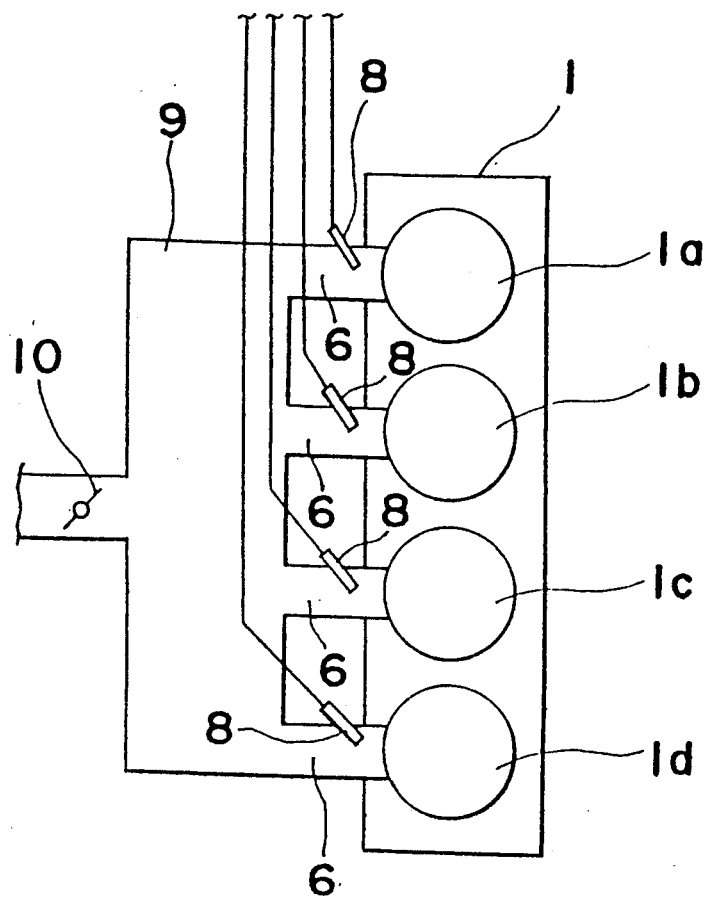
FIG. 2 is a schematic top plan view of an internal combustion engine to which the present invention is applied.

FIG. 2 schematically depicts a portion of the engine as viewed from above.

As shown in FIGS. 1 and 2, the engine 1 is provided with four cylinders 1a to 1d having respective combustion chambers 2, which communicate with a surge tank 9 through respective intake passages 6. Each combustion chamber 2 is provided with a spark plug 3 connected to an ignition coil 5 via a distributor 4. An injector 8 for injecting fuel is provided in each intake passage 6 in the vicinity of an intake port 7. A throttle valve 10 is disposed upstream of the surge tank 9 and a hot wire air-flow sensor 11 is disposed upstream of the throttle valve 10. Each injector 8 and the ignition coil 5 are controlled by a control unit 12, to which are inputted an intake air signal Qa outputted from the air-flow sensor 11 indicative of the amount of intake air 11, a crank angle signal θ outputted from a crank angle sensor mounted in the distributor 4, a cylinder discrimination signal T outputted from a cylinder sensor, an engine speed signal Ne outputted from a speed sensor 17 located in the vicinity of an output shaft (not shown) of the engine 1 and the like. The calculation of ignition timing, the amount of fuel to be injected and injection timing is performed with respect to each cylinder on the basis of these signals. Combustion air is led into each intake passage 6 through an air cleaner (not shown) and passes, along with fuel, through an intake valve 13 to be drawn into each combustion chamber 2. Exhaust air after combustion is led into an exhaust passage 15 through an exhaust valve 14 and discharged outside via a catalytic converter 16.

FIG. 3 is a time-chart indicative of the control characteristic of the fuel injection system according to a first embodiment of the present invention.

In FIG. 3, Qa and Tp represent the amount of intake air to be led into each combustion chamber and the amount of fuel to be injected, respectively. The amount Tp of fuel to be injected is obtained from the amount Qa of intake air and the engine speed Ne. When the amount Qa of intake air is less than a predetermined amount Qs, the fuel injection is performed with respect to the cylinder which is now located at the top of the intake stroke. This cylinder and this fuel injection are hereinafter referred to as Fcyl and Fcyl injection, respectively. In a range in which Qa is greater than Qs, when a certain cylinder is located at the top of the intake stroke, the fuel injection is performed with respect to the next cylinder which reaches the top of the intake stroke after 180° in crank angle. This fuel injection is hereinafter referred to as next cylinder injection.

Figure 4:
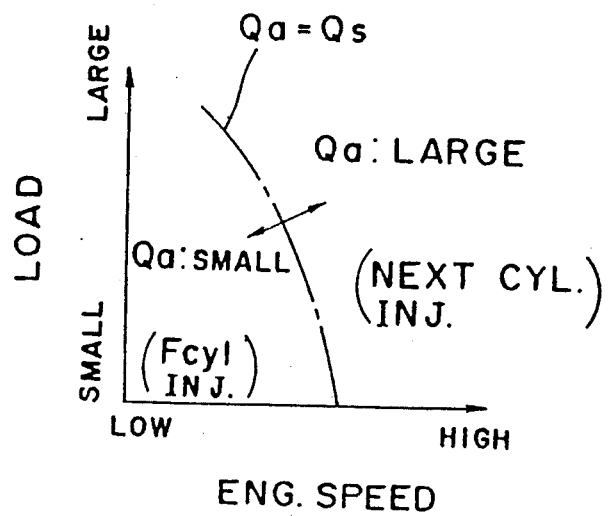
FIG. 4 is a diagram indicative of ranges of two different fuel injection patterns.

FIG. 4 is a diagram indicative of a range of the Fcyl injection and that of the next cylinder injection.

As shown in FIG. 4, a range on the side of low load and low speed in which Qa is less than Qs is the range of Fcyl injection while a range on the side of high load and high speed in which Qa is greater than Qs is the range of the next cylinder injection, with a line of Qa=Qs as the border.

Reference (c) in FIG. 3 represents a flag X for indicating either of two different fuel injection patterns. X=0 implies Fcyl injection while X=1 implies the next cylinder injection.

Reference (d) to (g) in FIG. 3 represent fuel injection pulses of the first cylinder (#1), the third cylinder (#3), the fourth cylinder (#4) and the second cylinder (#2), respectively. This order corresponds to the firing order. Ranges shown by arrows represent the intake stroke. For comparison, dotted lines represent injection pulses when no next cylinder injection is performed. Reference (h) represents the cylinder Fcyl which is now located at the top of the intake stroke.

In the range of Fcyl injection in which Qa is less than or equal to Qs, the amount Tp of fuel to be injected is calculated on the basis of the amount Qa of intake air detected at the top of the intake stroke of respective cylinders in the order of #1, #3, #4 and #2 so that fuel may be immediately injected into the appropriate cylinders.

On the other hand, in the range of the next cylinder injection in which Qa is greater than Qs, the amount Qa of intake air is detected 180° ahead in crank angle from the to of the intake stroke of respective cylinders, that is, at the top of the intake stroke of a cylinder immediately ahead of the cylinder to which the fuel injection is performed. On the basis of the detected value, the amount Tp of fuel to be injected is immediately calculated so that an appropriate amount of fuel may be injected. In other words, no fuel is injected into the cylinder Fcyl which is now located at the top of the intake stroke, but the amount Qa of intake air for the hext cylinder is detected at the top of intake stroke of the cylinder Fcyl. Thereafter, the amount Tp of fuel to be injected is immediately calculated and fuel injection is performed.

At the time of transfer from the region of Fcyl injection to that of the next cylinder injection, if #3 first reaches the top of the intake stroke immediately after Qa has entered the region of the next cylinder injection, as shown in FIG. 3(e), fuel injection is performed with respect to both #3 and next #4 at the top of this intake stroke, thereby preventing incomplete injection at the time of transfer.

In contrast, at the time of transfer from the region of the next cylinder injection to that of the Fcyl injection, if #1 first reaches the top of the intake stroke immediately after Qa has entered the region of the Fcyl injection, as shown at (d) in FIG. 3, the fuel injection with respect to #1 is not performed at the top of this intake stroke. In other words, since fuel injection with respect to #1 is completed at the top of intake stroke of #2, 180° ahead in crank angle from the top of the intake stroke of #1, fuel injection never will be performed two times by omitting fuel injection one time immediately after the transfer.

Under such control, when the engine load is low, the amount Qa of intake air is detected at the top of the intake stroke of the cylinder to which fuel is injected, thereby enabling the injection of fuel corresponding to the amount of air actually drawn into this cylinder. When the engine load is high, the fuel injection is initiated at the top of the intake stroke of a cylinder immediately ahead of the target cylinder to which fuel is injected. In this way, the injected fuel can be entirely led into the corresponding combustion chamber by the end of the intake stroke of the target cylinder which is delayed 180° in crank angle from that of a cylinder immediately ahead of this cylinder. Accordingly, under various conditions such as, for example, low load, high load, steady condition and transition period, fuel injection can be assuredly performed, resulting in improved drivability and emission performance.

Figure 5:
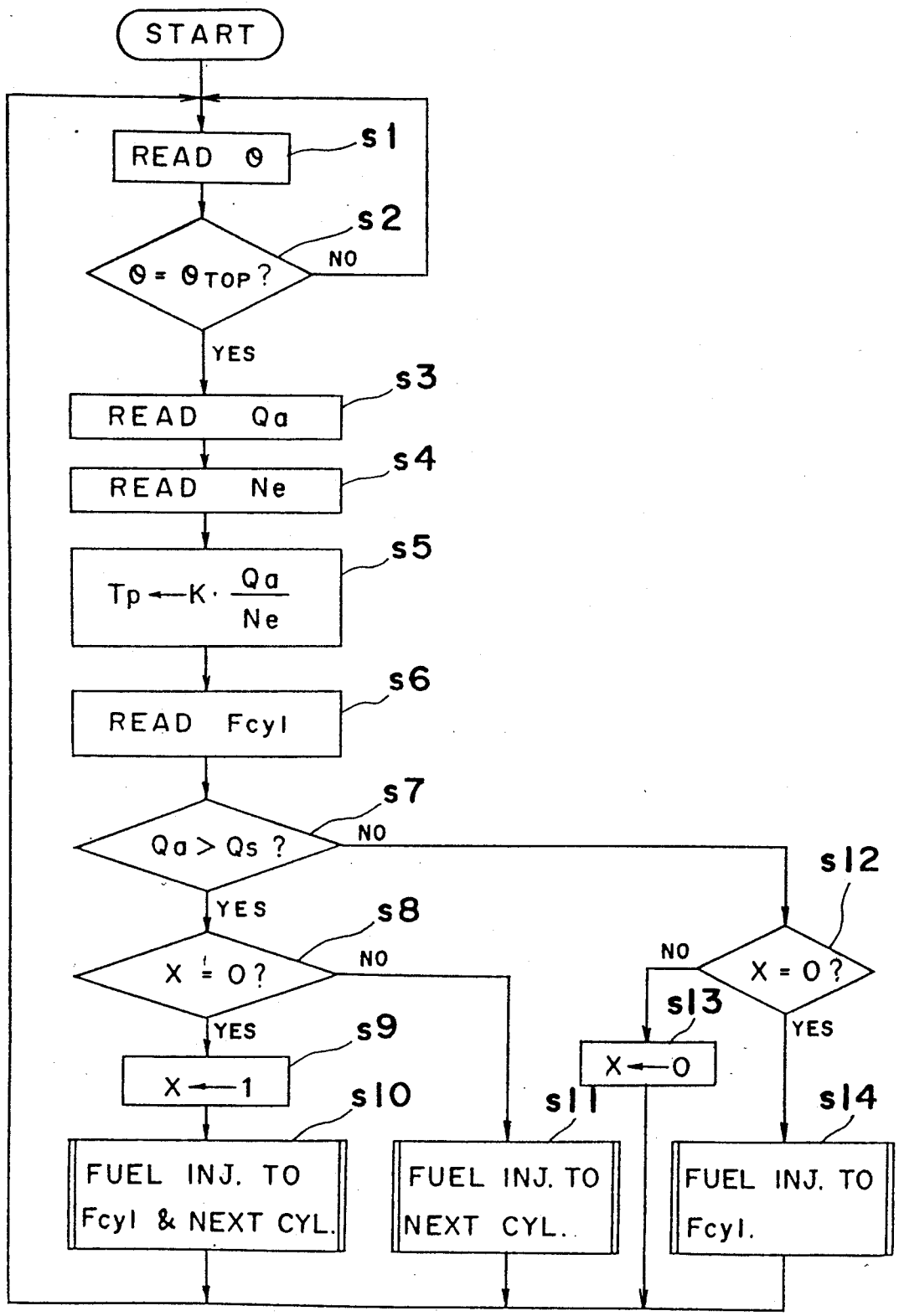
FIG. 5 is a flow-chart for executing the control according to the first embodiment.

FIG. 5 is a flow-chart for executing the control above.

The crank angle $\theta$ is initially read-in at step s1 followed by step s2 at which it is judged whether or not one of the cylinders is located at the top of the intake stroke. If the judgement at step s2 is YES, the amount Qa of intake air is read at step s3. Thereafter, the engine speed Ne is read at step s4 followed by step s5 at which the amount Tp of fuel to be injected is calculated by multiplying Qa/Ne by a constant K. If the judgement at step s2 is NO, the procedure returns to step s1.

At subsequent step s6, the cylinder Fcyl is read which is now located at the top of the intake stroke and discriminated on the basis of the cylinder discrimination signal T. Then, it is judged at step s7 whether or not Qa is greater than Qs. If Qa is greater than Qs, it is judged at step s8 whether or not the flag X is equal to 0.

When the flag X is equal to 0,, this implies that Fcyl injection has taken place the previous detection and Qa now becomes greater than Qs for the first time. Accordingly, the flag X is rendered to be 1 at step s9 and fuel injection is performed at step s10 with respect to both the cylinder Fcyl and the next cylinder which subsequently reaches the top of the intake stroke.

When Qa is greater than Qs and the flag X is not equal to 0, this implies that Qa has entered the region of the next cylinder injection before the previous detection and is now in this region. Accordingly, fuel injection is performed at step s11 with respect to only the next cylinder.

When Qa is not greater than Qs at step s7, it is judged at step s12 whether or not the flag X is equal to 0. If the flag X is not equal to 0, this implies that Qa has just entered the region of Fcyl injection. In this case, the flag X is rendered to be 0 at step s13 and no fuel injection is performed. In contrast, when the flag X is equal to 0 at step s12, this implies that Qa has entered the region of Fcyl injection before the previous detection and is now in this region. Accordingly, fuel injection is performed at step s14 with respect to the cylinder Fcyl which is now located at the top of the intake stroke.

In the foregoing embodiment, the fuel injection is performed in two different patterns, respective injection start timings of which deviate 180° in crank angle.

However, the fuel injection may be performed in several different patterns on condition that the deviation of respective patterns in injection start timing is lessened to, for example, 90° or less in crank angle.

Figure 6:
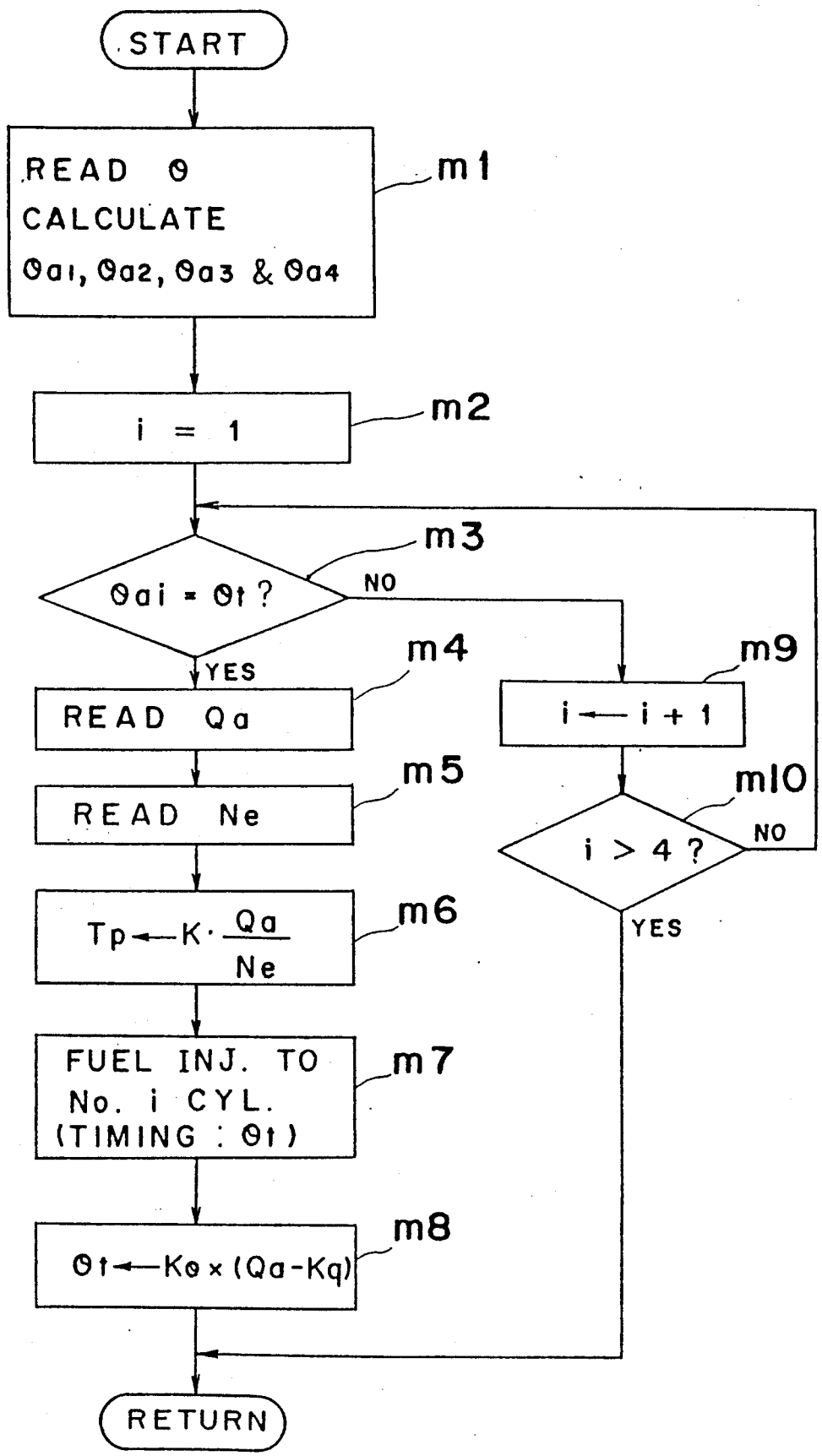
FIG. 6 is a flow-chart for executing the control according to a second embodiment of the present invention.

FIG. 6 is a flow-chart indicative of the control for the fuel injection system according to a second embodiment of the present invention, in which the fuel injection start timing is rendered to be variable in compliance with the amount Qa of intake air.

Figure 7:
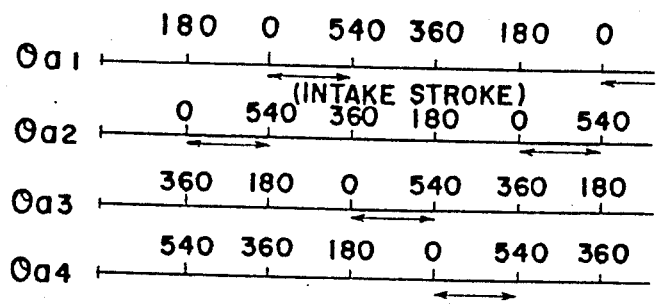
FIG. 7 is a diagram indicative of the position of each cylinder.

In the flow-chart of FIG. 6, the crank angle $\theta$ is initially read at step m1. In this event, all the cylinder positions $\theta ai$ (i=1−4), indicated in crank angle, ahead from the top of respective intake strokes are calculated, which deviate 180° each in the order of $\theta a1$, $\theta a3$, $\theta a4$ and $\theta a2$. For example, when #1 cylinder position $\theta a1$ is 0°, other cylinder positions $\theta a3$, $\theta a4$ and $\theta a2$ are 180°, 360° and 540°, respectively, as shown in FIG. 7. Each of the angles $\theta ai$ is greater than or equal to 0° and less than 720°.

Figure 8:
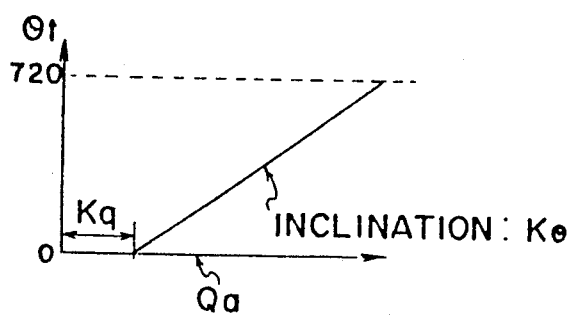
FIG. 8 is a diagram indicative of the relationship between the amount of intake air and fuel injection timing.

The number i is rendered to be 1 at step m2 followed by step m3 at which it is judged whether or not $\theta ai$ is equal to $\theta t$, the initial value of which is set to 0°. If $\theta ai$ is equal to $\theta t$, the amount Qa of intake air is read at step m4 followed by step m5 at which the engine speed Ne is read. At subsequent step m6, the amount Tp of fuel to be injected is calculated by multiplying Qa/Ne by a constant K. Thereafter, the amount Tp of fuel is injected to No. i cylinder at the timing $\theta t$ at step m7 followed by step m8 at which the new injection timing $\theta t$ is obtained by multiplying (Qa−Kq) by a constant K$\theta$. Kq is a constant and $\theta t$ is kept 0° until Qa becomes greater than the constant Kq. FIG. 8 is a diagram indicative of the relationship between $\theta t$ and Qa.

If $\theta ai$ is not equal to $\theta t$ at step m3, 1 is added to the number i at step m9 followed by step m10 at which it is judged whether or not the number i is greater than 4. If the number i is not greater than 4, the procedure returns to step m3. If the number i is greater than 4, the procedure returns to step m1.

It is noted here that the procedure above is repeated every $\Delta\theta°$ in crank angle.

Figure 9:
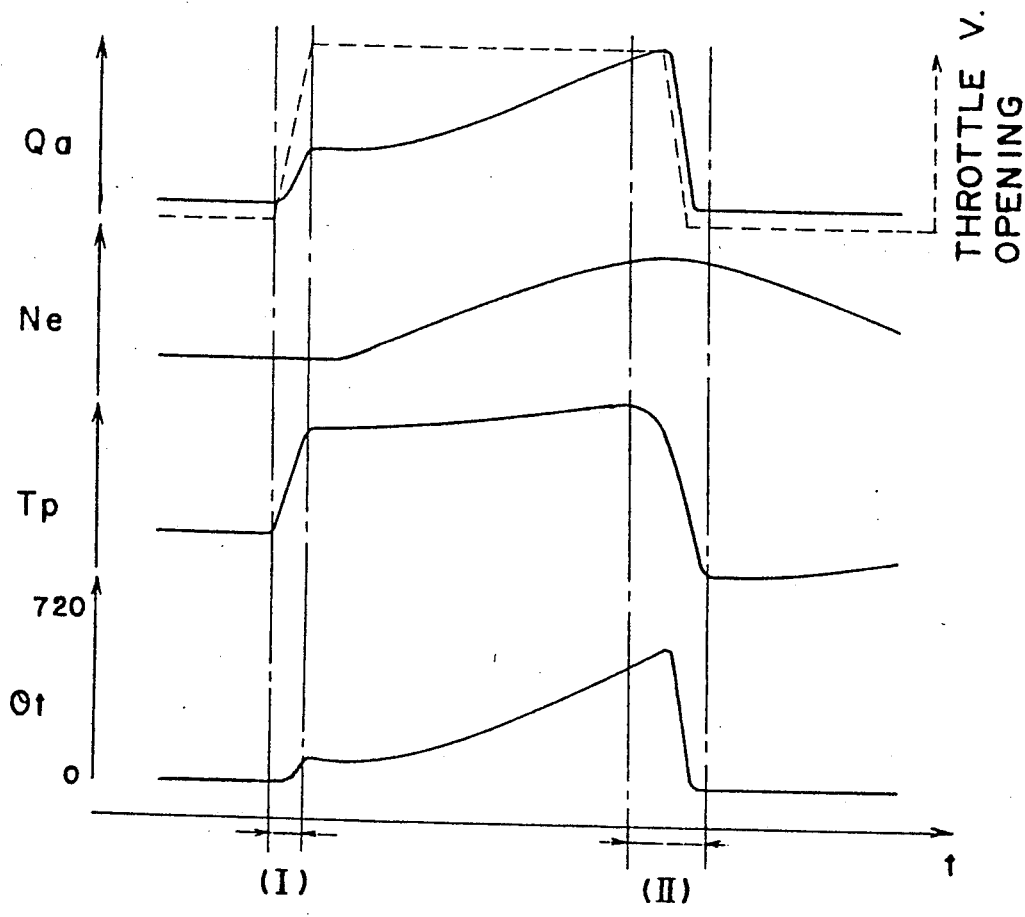
FIG. 9 is a time-chart indicative of the change of the amount of intake air, the engine speed, the amount of fuel to be injected and the fuel injection timing.

FIG. 9 is a time-chart indicative of the control of the fuel injection system according to the second embodiment of the present invention.

A dotted line shown in FIG. 9 represents the opening of the throttle valve 10. As the throttle valve 10 is gradually opened, the amount Qa of intake air led into the engine gradually increases, resulting in the increase of the amount Tp of fuel to be injected to each combustion chamber.

Figure 10:
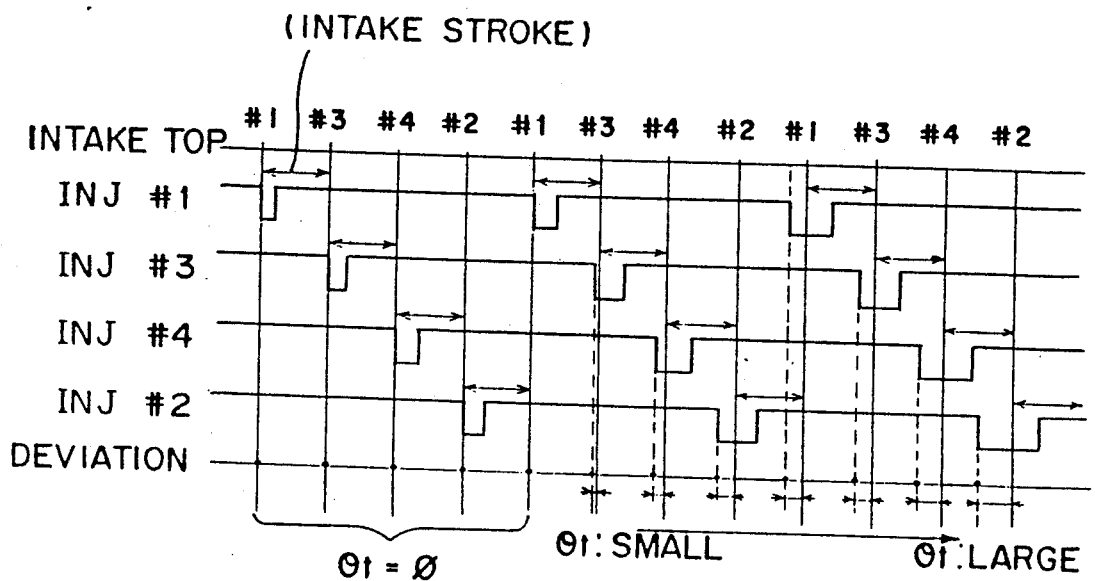
FIGS. 10 and 11 are diagrams indicative of fuel injection pulses of all the cylinders in the range of (I) and (II) in FIG. 9, respectively.

FIG. 10 illustrates fuel injection pulses of all the cylinders in a range of (I) shown in FIG. 9. In this range, when the amount Qa of intake air is less than the constant Kq, the beginning of the fuel injection coincides with that of the intake stroke. When the amount Qa of intake air has exceeded the constant Kq, the injection timing $\theta t$ gradually increases and the beginning of the fuel injection is gradually advanced from that of the intake stroke. With a certain time lag after the range (I), the engine speed Ne gradually increases.

Figure 11:
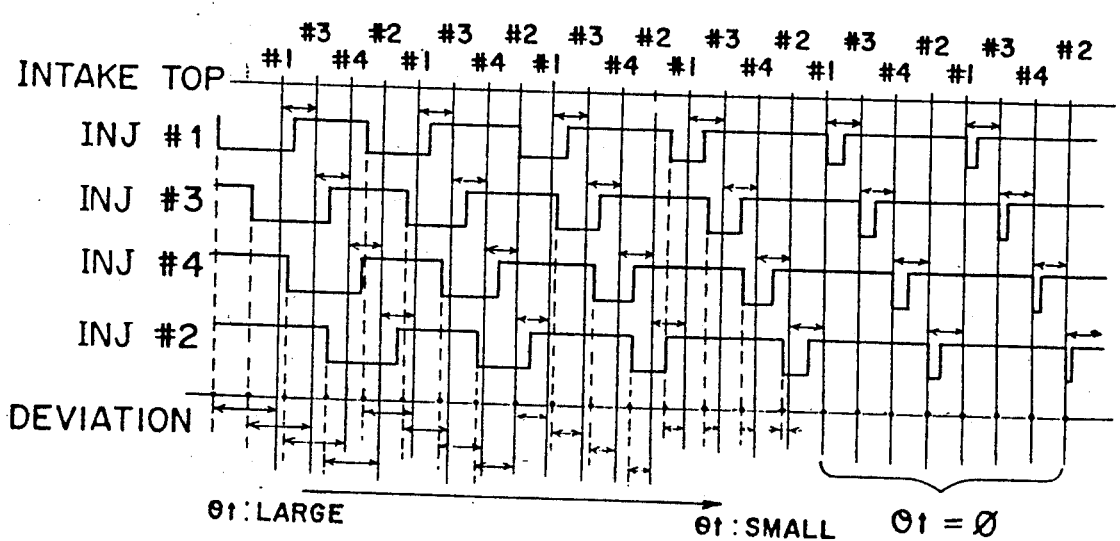

FIG. 11 illustrates fuel injection pulses of all the cylinders in a range of (II) shown in FIG. 9, in which the decrease of the amount Qa of intake air is followed by that of the amount Tp of fuel to be injected. In this range (II), the injection timing $\theta t$ gradually decreases and finally becomes 0°. After this range (II), the engine speed Ne gradually decreases.

It is to be noted here that in the foregoing two embodiments, although the fuel injection pattern is altered according to the amount of intake air, this pattern may be altered according to the engine load, the engine speed or the like.

It is further noted that in the foregoing embodiments, although the amount of intake air is detected at the top of the intake stroke, the detection timing of the amount of intake air can be set between the top of the intake stroke and a position 180° ahead therefrom.

As is clear from the above, the most appropriate amount of intake air can be reflected on the amount of fuel to be injected in a relatively wide driving range of the engine. In addition, notwithstanding the driving conditions, the entire injected fuel can be completely introduced into the combustion chamber of each cylinder by the completion of each intake stroke.

Although the present invention has been fully described by way of examples with reference &.o the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A fuel injection system for a multi-cylinder internal combustion engine having a plurality of independent intake passages communicating with combustion chambers of respective cylinders, said system comprising:
   fuel injection means securely mounted in respective intake passages;
   means for detecting an amount of intake air to be led into each combustion chamber;
   means for detecting a present stroke timing of each cylinder;
   means for detecting engine speed;
   control means for outputting a signal to said fuel injection means so that a predetermined timing on the basis of values detected by said respective detecting means, said control means comprising:
      means for setting an injection timing of fuel to be injected into each cylinder so that an injection start timing is altered in compliance with driving conditions of the engine; and
      means for setting an amount of fuel to be injected into each cylinder on the basis of at least the amount of intake air and the engine speed, said amount of intake air being detected at a timing which is altered in compliance with said injection start timing to be set by said fuel injection timing setting means, said timing for detecting said amount of intake air being close to said injection start timing, said means for setting the fuel injection timing comprising discrimination means for discriminating the amount of intake air led into each combustion chamber so that the injection start timing is altered in compliance with the amount of intake air in a manner such that when the amount of intake air is small, the injection start timing is set substantially at the beginning of the intake stroke of a target cylinder, and as the amount of intake air becomes large, the injection start timing is gradually advanced from said timing.

2. The system according to claim 1, wherein said means for setting the fuel injection timing sets an injection end timing so that fuel to be injected to each cylinder is completely led into the corresponding combustion chamber during its intake stroke.

* * * * *